United States Patent [19]
Steigerwald

[11] 3,814,443
[45] June 4, 1974

[54] SEALING MEANS
[75] Inventor: Karl-Heinz Steigerwald, Munich, Germany
[73] Assignee: Steigerwald Strahltechnik G.m.b.H., Munich, Germany
[22] Filed: Oct. 28, 1969
[21] Appl. No.: 871,891

[30] Foreign Application Priority Data
Oct. 28, 1968   Germany.......................... 1805719

[52] U.S. Cl. ..................................... 277/5, 277/80
[51] Int. Cl. ........................ F16j 9/00, F16j 15/00
[58] Field of Search ................................ 277/80, 5

[56] References Cited
UNITED STATES PATENTS
2,557,140   6/1951   Razdowitz........................... 277/80
2,974,981   3/1961   Vervest et al........................ 277/80
3,031,802   5/1962   Leliaert.......................... 277/80 UX FOREIGN PATENTS OR APPLICATIONS
267,656   11/1963   Australia............................. 277/80
1,553,537   12/1968   France............................... 277/80

Primary Examiner—Samuel B. Rothberg
Attorney, Agent, or Firm—Sandoe, Hopgood and Calimafde

[57] ABSTRACT

Sealing means for sealing spaces between at least two bodies comprising a magnetically influencable sealing compound positionable between said bodies and at least one magnetising device for magnetisation of said sealing compound to form a sealing lip extending between said parts; said sealing compound being flowable in at least the non-magnetised state and adapted to stiffen under the influence of a magnetic field.

26 Claims, 7 Drawing Figures

3,814,443

SEALING MEANS

The present invention relates to sealing means for sealing the space between two or more parts or members.

Detachable or attachable sealing means are known in which a sealing lip extends from one part and contacts another part, but only operate reliably when the surface which the sealing lip contacts is sufficiently smooth. If, however, a certain degree of surface roughness is exceeded, even sealing lips made of very soft and yielding material are no longer able to provide a satisfactory sealing. A further difficulty when sealing irregular surfaces is caused by the fact that the spacing between the part from which the sealing lip extends, and the other part contacted by the free end of the sealing lip necessarily has to be relatively large. The sealing lip will have to be very soft and resilient to adapt to the irregularities of the surface. Large, soft sealing lips, however, are fundamentally of little use for sealing purposes where appreciable pressure differences exist and hence are not usable for the sealing of vacuum chambers towards atmospheric pressure.

The difficulties described are even more strongly apparent when the sealing means are to operate as a moving seal, i.e., when the parts to be sealed are movable relative to one another and conditions are made even more difficult when at least one of the parts to be sealed are hot.

An example of a practical application in which the difficulties described arise is in the local processing of semi-finished products e.g. hot rolled extruded steel bars under vacuum. The region to be processed has to be sealed against the surrounding atmosphere since it is not generally possible to completely insert the whole semi-finished product into the vacuum chamber. An example of such processing is the cutting of hot extruded steel workpieces with electron beams of sufficiently high energy. The use of electron beams for this purpose is of particular advantage because clean, narrow cuts are obtained. It is, however, generally necessary for an electron beam to be produced and used in a vacuum, and hence suitable sealing is required between the electron beam generating system and the surface of the workpiece to be cut. Naturally, in most cases it is not expedient and not possible for reasons of cost for the surfaces of the hot extruded steel articles to be precision machined before cutting. In this processing it is of further advantage for the product to be cut whilst it is still warm as this reduces the power requirements for the cutting operation. In conventional sealing devices, however, the sealing lips are only able to withstand temperatures of up to a maximum of about 200° C.

An object of the invention is to provide a sealing means in which the sealing lip reliably seals also on highly irregular surfaces and yet has considerable strength under conditions such that relatively considerable pressure differences may exist across the sides of the sealing lip. In addition, the sealing lip should, if possible, be usable on hot surfaces.

According to the invention sealing means for sealing spaces between at least two juxtaposed parts comprises a magnetically influenceable sealing material positionable between said parts and at least one magnetising device for magnetisation of the sealing material to form a sealing lip extending between and sealing said parts. A material which is pliable or flowable in a non-magnetised state and stiffening or setting under the influence of a magnetic field is used as sealing material.

In the sealing means in accordance with the invention, the sealing material forming the lip is thus capable of adapting itself to any irregularity of the surface to be sealed and the sealing lip can then be magnetised to a suitable extent so as to be stiffened as necessary for withstanding relatively large pressure differences.

The sealing material may be made, for example, of a finely distributed magnetisable material such as iron powder, iron filings, small pieces of iron wire and the like in a non-magnetic carrier such as silicone oil. A suitable sealing material of this nature is described in U.S. Pat. No. 2,557,140. The use of suitable materials for the sealing material in which the carrier is made of a high temperature-resistant silicone oil, produces a high resistance to temperature. It is, of course, also possible to use a sealing material which is solid at room temperature and does not become plasticized or liquid until temperatures have increased, when the sealing means is for sealing exclusively heated components. Such a sealing material will comprise a non-magnetic carrier material of sufficiently high melting point and finely divided magnetizable material dispersed therein.

Preferably, the sealing material is flowable at least in the non-magnetised state and adapted to be expelled from an outlet opening on one part facing the other part and extending over the sealing region of a feed device connected with the other part. A further favourable feature is to provide a receiving device with clearance from the outlet opening and adapted to receive and divert sealing material forced out from the periphery of the point where the sealing lip formed by the sealing material contacts the surface of the other component. Since the magnetisation is less in the region of the receiving device, no difficulties of receiving the readily flowable sealing material therein are encountered. The outlet opening is conveniently located close to or in a pole piece of a magnet appertaining to the magnetizing device. In workpieces which have to be sealed on several sides, each side has a feed device each with an outlet opening associated therewith. It is thus a particularly preferable feature for two pole pieces which are associated with different sides to be oppositely magnetised. The sealing compound is preferably adapted to be expelled from the outlet opening subject to excess pressure. The outlet opening is preferably connected to a feed device for feeding sealing material which has been forced out.

A particularly favourable embodiment of the invention is characterised by the feature that the magnetising device is formed so that the sealing compound emanating from the outlet opening, has a magnetic force exerted thereon tending to force the sealing material back into the outlet opening. This arrangement is particularly suitable for sealing components made of non-magnetisable material; if the sealing compound is expelled from the outlet opening under excess pressure it is possible by suitable mutual balance between the excess pressure and the magnetisation to cause the sealing material to be urged against the surface of the other component. Sealing means usable in this manner may be further characterised by the feature that the sealing material is adapted to be expelled from a reservoir, which is located between pole pieces of a magnet appertaining to the magnetising device mounted on one component, into the outlet opening. The outlet opening is preferably located between the pole pieces of the magnet and a further preferable feature is for the opposite surfaces of the pole pieces in the outlet opening to be covered with non-magnetisable or only weakly magnetisable linings which extend to beyond the ends of the pole pieces. This lining may also be in the form of an insert body located between the pole pieces.

In the sealing means in accordance with the invention, it is preferable to provide the magnetising device with adjusting devices to vary the magnetisation of the sealing material. A further expedient development is for the magnetising device to be provided with a device for the timed varying of magnetisation of the sealing material, and when using the sealing device as a movement seal for sealing between components moving relative to one another, for changes of magnetisation of the sealing material in comparison with the speed of the relative movement to be effected rapidly between values at which the sealing material sets or becomes plasticised. Alternate setting and softening of the sealing material causes a quasi-elastic behaviour; this behaviour however differs from the behaviour of conventional elastic materials in that there is no predetermined surface configuration of the sealing lip in the inoperative position. A constant magnetic field may be superimposed on the variable magnetic field which suffices to retain the sealing material in a set state when the electromagnetic influence is removed and thus prevents the sealing material from flowing away. The variations of the magnetic field in operation of the seal hence have to weaken this constant magnetic field during each period of vibration to such an extent that the sealing material becomes temporarily soft. A permanent magnet may be used to produce the constant magnetic field and preferably consists of a material of low permeability and is located between the pole pieces of the electromagnet. The use of such material having a low permeability has the advantage that the magnetic alternating field is not noticeably weakened by the permanent magnet inserted between the pole pieces.

In an alternative embodiment of the invention, the sealing lip has a flexible apron for holding the sealing material together. The use of such an apron results in a sealing lip which behaves substantially more similar to conventional elastic seals. However, since the flexible apron may be very thin, the adaptability to surface irregularities in this embodiment is also considerably improved to that of conventional seals made of solid elastic material. It has, moreover, been found that the apron in many cases may be formed as a net without the inconvenient occurrence of great losses of sealing material. The use of a flexible apron, either impermeable or net-like, is convenient or necessary even in such cases where the temperature of the component or part against which the sealing lip is to be supported is higher than the Curie point of the magnetisable material present in the sealing lip. In applications of this kind it is necessary to ensure that the temperature is low enough in the region of the magnetising device to allow the active material of the sealing material to be again magnetisable. This will generally be made possible without difficulty, for example, by cooling the magnetising device and/or producing turbulences in the sealing material.

The sealing lip in accordance with a further advantageous embodiment of the invention, for the collection of lost sealing material may be permeated by bristles made of magnetisable material which extend from one part and are subjected to the influence of the magnetising device. When using the sealing means for sealing between two parts, at least one of which moves relative to one another, the arrangement is such that the bristles from the leading side of the sealing lip in accordance with the relative movement, extend towards the rear and are in sliding abutment against the other part.

As already mentioned, special advantages are derived when using the sealing means in accordance with the invention in energy beam processing devices wherein the energy beam operates in a vacuum.

The invention will be described further, by way of example, with reference to the accompanying drawings, in which.

Figure 1:
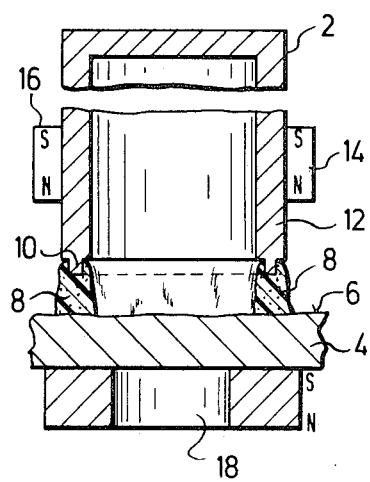
FIG. 1 shows a schematic sectional view of a basic arrangement of the sealing means.

A rudimentary embodiment of the invention is shown in FIG. 1 in which one part 2 in the form of a beaker-like housing is sealed by means of an annular sealing lip 8 formed of a magnetically influencable sealing compound, relative to another part in the form of workpiece 4 having an irregular surface 6. The free edge of the part 2 merges into an annular projection 10 and at least a portion 12 of the part 2 adjacent to this projection is made of magnetisable material e.g. a ferromagnetic material. The magnetising device consists simply of a plurality of semi-annular permanent magnets 14, 16, which are mounted on the circumference of part 2 and an annular opposite magnet 18 mounted on the other side of the workpiece 4. The magnets 14, 16 and 18 are magnetised in their axial extension so that the magnetic field between the surface 6 of the workpiece 4 and the annular projection 10 magnetises the sealing compound to form sealing lip 8. The rigidity of the sealing lip 8 may be optionally adjusted by the power and arrangement of the magnets so that a greater or lesser magnetisation of the sealing compound forming the sealing 8 results. The magnets 14, 16, 18 may be formed partly or wholly of electromagnets. It is often possible to omit the opposite magnet 18 when the workpiece 4 to be sealed is made of ferromagnetic material.

Figure 2:
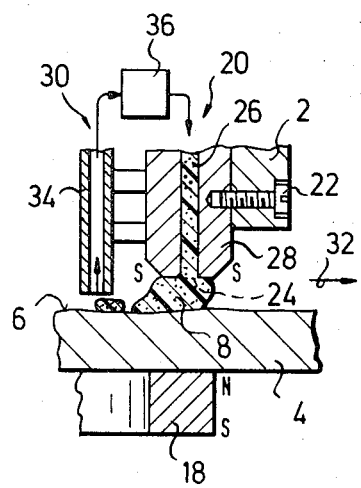
FIG. 2 is a schematic sectional view of an alternative embodiment.

Whilst FIG. 1 is more an explanation of the basic method of operation of the invention, FIG. 2 shows a schematic sectional view of an alternative embodiment better suited for many practical applications. A feed device 20 for the magnetisable sealing compound is mounted on part 2 which is to be sealed relative to the other part 4 and secured, for example, by means of screws 22. The sealing compound issued from the outlet opening 24 of the feed device 20 in the direction of the surface 6 of the part 4. The outlet opening 24 extends over the whole sealing region; if, for example, a ring seal such as shown in FIG. 1 is required, the outlet opening is also annular. It is, however, also possible to use a plurality of outlet openings located close together which act as a single continuous outlet opening.

The magnetising device is not shown in details in FIG. 2. The outlet opening 24 forms the lower end of a reservoir 26 for the sealing compound which extends through a pole piece 28 of a magnet appertaining the magnetising device. In such or similar arrangements the sealing compound contained in the reservoir 26 is only slightly magnetised. In this manner it is possible to provide for the sealing compound within the storage reservoir 26 to be sufficiently flowable, whilst after issue from the outlet opening 24 for it to set in the required manner. On the other side of the part 4 a counter magnet 18 is also provided which is so polarised that the magnetic field setting the sealing lip 8 extends between the pole piece 28 and the opposite magnet 18 through the part 4 to be sealed. When part 4 is made of ferromagnetic material it is possible in many cases for the counter magnet 18 to be omitted.

In the embodiment shown in FIG. 2 a receiving device 30 is provided spaced from the outlet opening 24 for receiving and diverting expelled sealing compound. This receiving device is particularly convenient when the sealing means is to be used where at least one part is moving. In FIG. 2 the possible direction of movement of part 2 together with the feed device 20 and the receiving device 30 relative to the part 4 is indicated by arrow 32. The counter magnet 18 may be either completely omitted or be moved mutually with part 2 with spacing from the underside of the part 4. During the relative movement between the parts 2 and 4, the sealing compound is caught on part 4. With progressive relative movement, the magnetic field strength acting on these portions of sealing compound diminishes, so that the compound loses its rigidity and can be received by the receiving device 30 following with spacing from the outlet opening 24. The receiving device 30 in the embodiment shown in FIG. 2 substantially comprises a receiving tube 34 which is connected to a conveyor device generally indicated at 36. The conveyor device returns the material received by the tube 34 back into the storage space 26.

Figure 3:
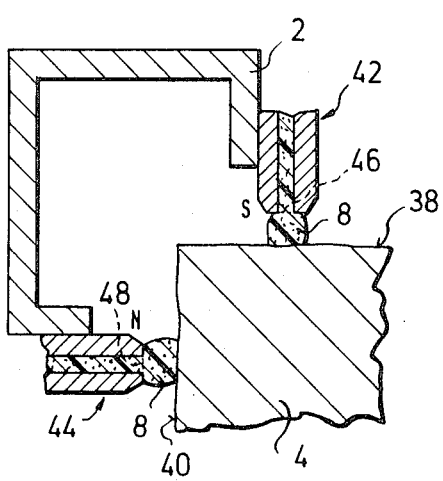
FIG. 3 is a schematic sectional view of a further embodiment.

A further embodiment is illustrated in FIG. 3 wherein sealing is required between one part 2 in the form of a housing and two sides 38 and 40 of another part 4. Each side 38, 40 has a feed device 42, 44 associated therewith each of which devices having an outlet opening 46 or 48. As in the arrangement of FIG. 2 the outlet openings are formed in the end faces of the pole pieces of the magnetising device (not shown). In most cases it is preferable for the opposed pole pieces associated with the various sides of the parts to be oppositely magnetised and this is indicated in FIG. 3 and in FIGS. 1 and 2 by the designations N and S.

Figure 4:
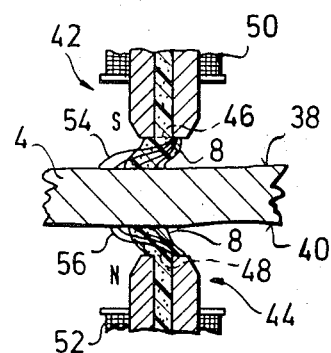
FIG. 4 is a schematic sectional view of a further possible embodiment.

FIG. 4 shows a similar arrangement of FIG. 3, but with a part 4 in form of a plate which has to be sealed on both sides. As in FIG. 3, each side 38, 40 has associated therewith a feed device 42, 44 each of which has an outlet opening 46, 48, so that a sealing lip 8 is formed on both sides. Moreover, in FIG. 4 portions of coils 50 and 52 are also indicated which serve the magnetisation. Furthermore, bristles 54, 56 of magnetisable material are also indicated in FIG. 4 which are preferably used when the sealing means are being used between moving parts. If, for example, in the arrangement shown in FIG. 4, the part 4 moves to the left relative to the parts of the sealing means, the bristles shown are preferably used which extend from the front side of the sealing lip 8 in accordance with the relative movement diagonally to the rear and are in sliding engagement along the surface of the part 4. These bristles cause a magnetic reception of the proportions of sealing compound forming the sealing lip 8 caught on the part 4.

It is, of course, also possible to use the receiving device 30 shown in FIG. 2 in addition to the bristles 54, 56. It is, moreover, also possible to arrange receiving devices to collect sealing compound caught on both sides of the outlet opening 24, 46 or 48, so that the sealing device is readily usable as a movement seal with optional direction of movement. The possible arrangement illustrated in FIGS. 3 and 4 of providing simultaneous sealing devices on a plurality of sides may be used in any embodiment of the sealing device, for example, also in the embodiments shown in FIGS. 1 and 2.

As already mentioned, there are numerous materials which may be influenced magnetically and which are suitable as sealing compounds. Depending upon the sealing compound used, the setting under the influence of magnetisation which occurs in addition to the magnetic attraction, is pronounced to a greater or lesser degree. In the case of movement seals, for example, sealing compounds will be preferred which remain plastically deformable over a wide range of field intensities, whilst in static seals sealing compounds will readily be used which become substantially completely rigid under the influence of a magnetic field. In sealing compounds which in the manner described above consist of a carrier and particles of magnetisable material suspended therein, the properties of the sealing compound depend widely upon the type of suspended particles used, and more particularly depend upon their shape. Thus, for example, powder, small balls, filings, threads or bristles may be suspended in the carrier, and it is obvious that when using spherical powder particles, for example, a lesser solidification occurs than in sealing compounds in which the suspended particles have irregular shapes.

Figure 5:
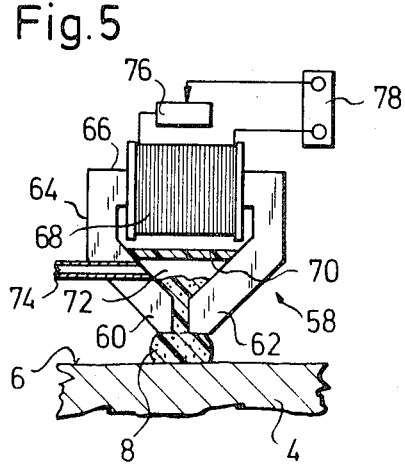
FIG. 5 is a schematic sectional view of a further possible embodiment.
Figure 6:
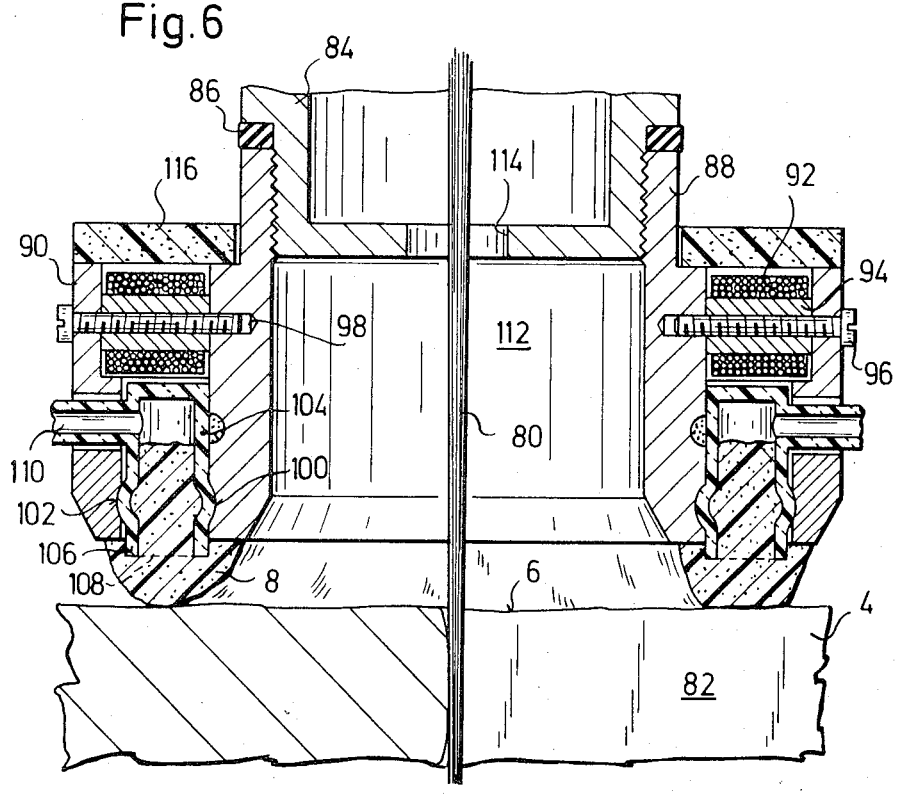
FIG. 6 is a schematic sectional view of a still further embodiment, in which a sealing lip is enveloped by an apron.

In many cases it is not possible or expedient to build up the magnetic field acting on the sealing compound in the manner as shown in FIGS. 1 to 4 between a pole piece and the part 4. This is the case particularly where the parts to be sealed are made of non-magnetisable materials. Suitable embodiments of sealing means for such intended uses are shown in FIGS. 5 and 6. It is preferable for the magnetising device to be so formed that a magnetic force may be exerted on the sealing compound issuing from the outlet opening so as to force it back into the outlet opening. If the sealing compound is expelled from the outlet opening under excess pressure, (which is also possible in other embodiments), the ratio of the expelling force exerted by the excess pressure and the force driving back exerted by the magnetic field may be so adjusted that the sealing lip is forced with a certain pressure against the surface of the part to be sealed. This mode of operation is, of course, suitable predominantly for sealing compounds which have completely set in the magnetised state.

An alternative arrangement and mode of operation is described in connection with FIGS. 5 and 6 in which completely set sealing compounds may also be used for movement seals.

The sealing device shown in FIG. 5 contains a magnet 58 having a core 64 of magnetisable material, for example, soft iron, which may also be laminated tapering into two pole pieces 60, 62. An exciter winding 68 is located on the yoke part 66 of the magnet. The space 72 enclosed by the core 64 and a non-magnetic partition 70 is preferably connected to the surrounding only via the gap between the pole pieces 60, 62. A feed pipe 74 leads into the space 72 and is used to replace sealing compound which has issued from space 72. Furthermore, the space 72, acting a storage space for the sealing compound may, if necessary, be subjected to excess pressure via pipe 74. For as long as the sealing compound is capable of flowing, it will flow subject to the influence of such an excess pressure or simply due to gravity through the gap between the pole pieces 60, 62 and form a drop on the underside of the pole pieces which comes into contact with the surface 6 of the part 4 to be sealed. The core 64, of course, is hermetically connected in any way (not shown) with a part of the sealing arrangement.

FIG. 5 illustrates an alternative embodiment of the invention for varying the magnetisation of the sealing compound with the assistance of an adjusting device, which is made simply as a variable resistance 76 in the electrical connection between the exciter winding 68 and a source 78.

The embodiment shown schematically in FIG. 6 shows suitable sealing means for cutting a workpiece, for example, a hot extruded steel bar, by means of an electron beam 80. In accordance with FIG. 6, the electron beam 80 moves from right to left, so that the cutting gap 82 also moves progressively from right to left. The regularly cylindrical end section of the electron beam generator 84 is screwed into the upper end of a pole piece 88 with interposition of a ring packing 86. This first pole piece 88 is enclosed by a second pole piece 90 which is also of regular cylinder shape and formed of two semi-cylindrical parts which are held together by a clamping device (not shown). A number of exciter windings 92 are provided in the annular space between the pole pieces 88 and 90; each winding being mounted on a yoke 94 which acts as spacer between the pole pieces 88 and 90 and which is provided with a central bore. Through this bore and a corresponding bore in the pole piece 90 a fixing screw 96 extends and is screwed into a tapped hole 98 in the pole piece 88. Internal indentations are provided close to the lower ends of the pole pieces 88, 90 and serve for the snaplike mounting of an insert member 104 made of non-magnetic or only low-magnetisable material, such as bronze. The insert member shown has the shape of an annular passage having an outlet section 106 protruding beyond the free ends of the pole pieces, and defining the outlet opening 108. The insert member is retained in situ by annular projections which engage in the indentations 100, 102. The insert member 104 is provided with at least one additional feed pipe 110 close to its upper end. To facilitate the assembly of the insert member 104 and the pole pieces 88, 90, the outer pole piece at points where the outlet section 106 is located, may be provided with axial slots and the latter may be closed by separate filling pieces after insertion of the insert member 104, which filling pieces are secured in any manner (not shown) on the pole piece 90.

The additional feed pipe 110 serves to introduce the sealing compound into the insert member 104 and to exert a predetermined pressure against the sealing compound to force it outwards so that it forms a sealing lip 8 making contact with the surface 6 of the part 4 to be sealed.

The inner chamber 112 of the sealing means, through which the electron beam 80 passes, is evacuated by pumping devices (not shown), and possibly via the passage opening 114 leading to the electron beam generator 84.

To prevent losses of sealing compound, when the exciter windings 94 are de-energised, the magnetising means of FIG. 6 is additionally provided with an annular permanent magnet 116 which may also be made of a plurality of annular section members and which are each radially magnetised. The permanent magnet 116 is made of a ceramic material of low permeability, so that the magnetising effect of the windings 92 does not noticeably interfere despite the fact that it bridges the pole pieces 88, 90. Although in the embodiment shown the greater proportion of the magnetic flux supplied by the permanent magnet 116 is short-circuited by the yoke 94, it is possible in this or in a similar manner to magnetise the sealing compound to such an extent that it is partly or wholly solidified. The exciter winding 92 may be operated that the effect of the permanent magnet is reduced to a greater or lesser extent. The permanent magnet may, of course, also be positioned at different points of the magnetic member; for example, an annular permanent magnet may be arranged between the lower ends of the pole pieces 88 and 90 and be separated from these pole pieces by narrow gaps, through which the sealing compound may pass.

When using the sealing means for a seal between moving parts, particular advantage may be obtained from the fact that magnetising of the sealing compound occurs in timed periods. If, for example, in the sealing means shown in FIG. 6, the exciter winding 92 is excited with an alternating current or a pulsating current and by means of the feed pipe 110 an excess pressure is exerted on the sealing compound during each time interval in which the magnetisation established by the exciter winding 92 does not suffice to solidify the sealing compound, then the sealing compound will flow outwardly. However, in the time intervals in which the magnetising current created by the exciter winding 92 exceeds a certain value, the sealing compound becomes rigid or at least partially rigid. Furthermore, proportions of the sealing lip 8 which are lost by friction or other action with the surface 6 of the part 4 to be sealed, are magnetically attracted and united again with the main quantity of sealing compound. When the changes of magnetisation of the sealing compound occur in comparison with the speed of the relative movement between the sealing means and the part 4 in relatively quick succession, the sealing lip follows quasi-elastically all irregularities of the surface 6. The permanent magnet 116 ensures that the sealing compound is sufficiently solid so as to prevent loss when the exciter is switched off. The permanent magnet may be replaced by producing a constant proportion of magnetic flux by feeding the exciter winding 92 with current which includes direct current components. It is also possible to use two separate windings for direct current or alternating current.

Figure 7:
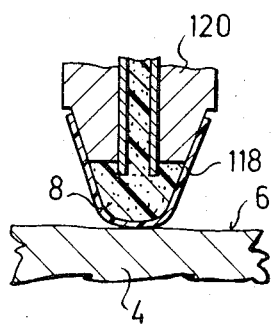
FIG. 7 shows a considerably simplified schematic sectional view of an electron beam cutting tool in which a further embodiment of the sealing arrangement is used.

An alternative embodiment of the invention is shown in FIG. 7 in which the sealing lip 8 formed of sealing compound is surrounded by a flexible apron 118 which is sealingly secured to a pole piece 120 to retain and hold the sealing compound together (or two opposite pole pieces as in FIG. 6). The apron 118, for example, may be made of plastics foil, rubber foil, asbestos paper or the like flexible material. In certain cases it is also possible to use an apron 118 in the form of a fine wire mesh. The use of an apron in accordance with the embodiment of FIG. 7 is of particular advantage when the part 4 to be sealed has a relatively high temperature above that of the Curie point of the magnetisable particles suspended in the sealing compound. In such a case the proportions of the sealing lip 8 which are in direct contact with the hot surface 6 are no longer attracted and collected by the magnetic field of the magnetising device. If on the other hand an apron is provided then no losses of sealing compound can occur and it is readily possible using suitable means (not shown) to produce sufficient cooling, for example, by creating turbulence in the sealing compound, to prevent the sealing compound from being heated to a temperature above that of its Curie point. The disturbances described occurring when the part 4 is at an excessively high temperature may be avoided also by means of a receiving device which extracts excessively heated portions of sealing compound by suction and after cooling adds them to the storage space of sealing compound again for re-supply to the sealing lip. An example of such a receiving device is described in connection with FIG. 2.

What I claim is:

1. A sealing device for sealing spaces between at least two juxtaposed relatively movable members in air-tight manner, comprising a sealing lip extending between said members formed of sealing material which is capable of being stiffened under the influence of a magnetic field, and means for variably magnetizing said sealing lip, said magnetizing means producing magnetization of said sealing lip which varies periodically and relatively rapidly as compared with the speed of said relative movement between values at which said sealing material of said sealing lip sets and softens, respectively, and in which said magnetizing means includes means for superposing a constant magnetization on said periodically and rapidly variable magnetization, said constant magnetization being of a strength which is sufficient alone to maintain said sealing material of said sealing lip in said set condition.

2. A sealing device in accordance with claim 1, in which said means for superposing a constant magnetization comprises a permanent magnet.

3. A sealing device in accordance with claim 2, in which said magnetizing means comprises an electromagnet having two pole pieces, said permanent magnet being arranged between said pole pieces and consisting of a material of low magnetic permeability.

4. A sealing device for sealing spaces between at least two juxtaposed relatively movable members in air-tight manner, comprising a sealing lip extending between said members formed of sealing material which is capable of being stiffened under the influence of a magnetic field, and means for variably magnetizing said sealing lip, said magnetizing means producing magnetization of said sealing lip which varies periodically and relatively rapidly as compared with the speed of said relative movement between values at which said sealing material of said sealing lip sets and softens, respectively, said sealing lip being provided with a flexible apron for holding said sealing material together.

5. A sealing device in accordance with claim 4, in which said apron is formed of wire mesh.

6. A sealing device for sealing spaces between at least two juxtaposed relatively movable members in air-tight manner, comprising a sealing lip extending between said members formed of sealing material which is capable of being stiffened under the influence of a magnetic field, and means for variably magnetizing said sealing lip, said magnetizing means producing magnetization of said sealing lip which varies periodically and relatively rapidly as compared with the speed of said relative movement between values at which said sealing material of said sealing lip sets and softens, respectively, said sealing lip including bristles made of magnetizable material extending therethrough, which said bristles are attached to one of said members and extend into sliding contact with the other member.

7. A sealing device for sealing spaces between at least two juxtaposed relatively movable members in air-tight manner, comprising a sealing lip extending between said members formed of sealing material which is capable of being stiffened under the influence of a magnetic field, and means for variably magnetizing said sealing lip, said magnetizing means producing magnetization of said sealing lip which varies periodically and relatively rapidly as compared with the speed of said relative movement between values at which said sealing material of said sealing lip sets and softens, respectively, said sealing material being flowable in a non-magnetized condition, and means for feeding sealing material to form said sealing lip, said feed means being attached to one of said relatively movable members and having an outlet opening through which said sealing material is expelled to form said sealing lip.

8. A sealing device in accordance with claim 7, including receiving means having an inlet opening spaced from said outlet opening and adapted to collect sealing material from the region adjacent the sealing region.

9. A sealing device in accordance with claim 7, including means for applying pressure to said sealing material to be expelled, said magnetizing means being arranged to apply a magnetic force urging said sealing material back into said outlet opening.

10. A sealing device in accordance with claim 7, in which said outlet opening is located close to or in a pole piece of said magnetizing means.

11. A sealing device in accordance with claim 7, in which said outlet opening is located between pole pieces of said magnetizing means which are of opposite polarity.

12. A sealing device in accordance with claim 10, in which said pole piece is provided with a lining of substantially nonmagnetizable material within said outlet opening, which extends to beyond the end of said pole piece.

13. A sealing device in accordance with claim 10, in which said outlet opening forms the discharge end of a reservoir space.

14. A sealing device in accordance with claim 13, in which said reservoir space and said outlet opening are formed in an insert member formed of substantially non-magnetizable material.

15. A sealing device in accordance with claim 13, in which said outlet opening protrudes beyond the free end of said pole piece.

16. A sealing device for sealing spaces between at least two juxtaposed relatively movable members in airtight manner, comprising a sealing lip extending between said members formed of sealing material which is capable of being stiffened under the influence of a magnetic field but is flowable in a nonmagnetized condition, and means for feeding sealing material to form said sealing lip, said feed means being attached to one of said members and having an outlet opening through which said sealing material is expelled to form said sealing lip.

17. A sealing device in accordance with claim 16, in which said sealing lip is provided with a flexible apron for holding said sealing material together.

18. A sealing device in accordance with claim 16, including receiving means having an outlet opening spaced from said outlet opening and adapted to collect sealing material from the region adjacent the sealing region.

19. A sealing device in accordance with claim 16, including means for applying pressure to the sealing material to be expelled from said outlet opening, said magnetizing means being arranged to apply a magnetic force urging the sealing material back into said outlet opening.

20. A sealing device in accordance with claim 16, in which said outlet opening is located close to or in a pole piece of said magnetizing means.

21. A sealing device in accordance with claim 16, in which said outlet opening is located between pole pieces of said magnetizing means which are of opposite polarity.

22. A sealing device in accordance with claim 20, in which said pole piece is provided with a lining of substantially non-magnetizable material within said outlet opening, which extends to beyond the end of said pole piece.

23. A sealing device in accordance with claim 19, in which said outlet opening forms the discharge end of a reservoir space.

24. A sealing device in accordance with claim 23, in which said reservoir space and said outlet opening are formed in an insert member formed of substantially non-magnetizable material.

25. A sealing device in accordance with claim 24, in which said outlet opening protrudes beyond the free end of said pole piece.

26. A sealing device in accordance with claim 17, in which the apron is formed of wire mesh.

* * * * *